US012646970B2

(12) United States Patent
Sadagopan et al.

(10) Patent No.: US 12,646,970 B2
(45) Date of Patent: Jun. 2, 2026

(54) MULTI-BAND ANTENNA RECTIFIER CODESIGN FOR AMBIENT ENERGY HARVESTING

(71) Applicant: QUALCOMM Incorporated, San Diego, CA (US)

(72) Inventors: Kamala Raghavan Sadagopan, San Diego, CA (US); Elizabeth Wyrwich, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/794,516

(22) Filed: Aug. 5, 2024

(65) Prior Publication Data

US 2026/0039143 A1 Feb. 5, 2026

(51) Int. Cl.
*H02J 50/00* (2016.01)
*H02J 50/27* (2016.01)
*H02J 50/40* (2016.01)

(52) U.S. Cl.
CPC ............ *H02J 50/001* (2020.01); *H02J 50/27* (2016.02); *H02J 50/402* (2020.01)

(58) Field of Classification Search
CPC .......... H02J 50/001; H02J 50/10; H02J 50/12; H02J 50/27; H02J 50/402; H01Q 9/00; H01Q 1/00
See application file for complete search history.

(56) References Cited

U.S. PATENT DOCUMENTS

| | | | | |
|---|---|---|---|---|
| 9,548,535 B1* | 1/2017 | Kuo | .......................... | H01Q 3/34 |
| 2006/0071864 A1* | 4/2006 | Richard | ................. | H01Q 1/242 |
| | | | | 343/702 |
| 2009/0058601 A1* | 3/2009 | Balachandran | ........ | H03G 11/00 |
| | | | | 340/10.1 |
| 2014/0063666 A1* | 3/2014 | Kallal | ...................... | H02H 3/20 |
| | | | | 361/56 |
| 2017/0358957 A1* | 12/2017 | Mitcheson | ............. | H01Q 5/364 |
| 2019/0013690 A1* | 1/2019 | Chen | ......................... | H02J 7/34 |
| 2019/0260239 A1* | 8/2019 | Coelho De Souza | ... | H04B 5/26 |
| 2025/0070596 A1* | 2/2025 | Al-Absi | ................. | H02J 50/20 |

* cited by examiner

*Primary Examiner* — Daniel Cavallari
*Assistant Examiner* — Joseph N Inge
(74) *Attorney, Agent, or Firm* — Smith Tempel Blaha LLC/Qualcomm

(57) ABSTRACT

A multi-band ambient energy harvesting apparatus is disclosed. The apparatus may comprise: at least one antenna that is electrically tuned to multiple frequency bands; and a rectifier electrically coupled to the at least one antenna, where the rectifier is electrically tuned to the multiple frequency bands of the at least one antenna, the at least one antenna has a first reactance, the rectifier has a second reactance, and the second reactance is approximately equal to a negative value of the first reactance at each of the multiple frequency bands to cause the at least one antenna to resonate at the multiple frequency bands.

19 Claims, 7 Drawing Sheets

DUAL-BAND INDUCTIVE LOOP ANTENNA 302

LOOP ANTENNA ELEMENT 300

PERIMETER 304

PARASITIC STRUCTURE 310

2ND TUNNING STUB 314

INTERIOR 306

FEED PORT 308

1ST TUNNING STUB 312

LENGTH 316

WIDTH 318

402

400

MULTI-BAND ANTENNA RECTIFIER CODESIGN FOR AMBIENT ENERGY HARVESTING

BACKGROUND

Ambient internet-of-things (IOT) devices are devices that are generally small and combine low cost with the ability to be deployed inconspicuously to address a wide range of applications. In general, ambient IoT is a 3GPP IoT device which is much smaller and cheaper compared to previous generations of IoT devices; and typically is, or includes, an ambient energy harvesting device that is powered by energy sources such as ambient radio waves via energy harvesting.

Ambient energy harvesting devices are devices that are generally small and combine low cost with the ability to be deployed inconspicuously to address a wide range of applications.

Energy harvesting, as it applies to ambient devices, is the harnessing of the power in ambient radio waves to power electronic circuits within the ambient devices. This radio wave energy harvesting capability generally frees the ambient devices from any monetary/replacement burdens of needing batteries or direct power connectivity.

Generally, these ambient energy harvesting devices include an antenna-rectifier architecture that is designed to achieving good energy harvesting sensitivity and long-range operation, while not employing an external and/or internal matching network between the antenna and the rectifier. Typically, these ambient energy harvesting devices are configured to harvest from both unlicensed industrial, scientific, and medical (ISM) bands at 900 MHz and 2,400 MHz because 900 MHz generally has lower pathloss and, therefore, enhanced range, and 2,400 MHZ, at present, is very common with many infrastructure devices (e.g., cellular phones, laptops, wireless routers, access points, etc.).

Typically, antenna-rectifier architectures for these types of ambient energy harvesting devices utilize multiple antennas with corresponding rectifiers that resonate at the different frequencies. Generally, existing solutions employ one antenna each and a custom rectifier for each band, resulting in a relatively large substrate area for the two antennas and larger chip area.

SUMMARY

Techniques are discussed for energy harvesting energy with a multi-band ambient energy harvesting apparatus. The apparatus may comprise: at least one antenna that is electrically tuned to multiple frequency bands; and a rectifier electrically coupled to the at least one antenna, where the rectifier is electrically tuned to the multiple frequency bands of the at least one antenna, the at least one antenna has a first reactance, the rectifier has a second reactance, and the second reactance is approximately equal to a negative value of the first reactance at each of the multiple frequency bands to cause the at least one antenna to resonate at the multiple frequency bands.

Also discussed is a dual-band antenna rectifier codesign device for ambient energy harvesting. The dual-band antenna rectifier codesign device may comprise: a dual-band antenna that is electrically tuned to two frequency bands; and a rectifier electrically coupled to the at the dual-band antenna, where the rectifier is electrically tuned to the two frequency bands of the dual-band antenna, the dual-band antenna has a first reactance, the rectifier has a second reactance, and the second reactance is approximately equal to a negative value of the first reactance at each of the two frequency bands to cause the dual-band antenna to resonate at the two frequency bands.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

DETAILED DESCRIPTION

Techniques are discussed for energy harvesting energy with a multi-band ambient energy harvesting (AEH) apparatus. The apparatus may comprise: at least one antenna that is electrically tuned to multiple frequency bands; and a rectifier electrically coupled to the at least one antenna, where the rectifier is electrically tuned to the multiple frequency bands of the at least one antenna, the at least one antenna has a first reactance, the rectifier has a second reactance, and the second reactance is approximately equal to a negative value of the first reactance at each of the multiple frequency bands to cause the at least one antenna to resonate at the multiple frequency bands.

Also discussed is a dual-band antenna rectifier codesign device for AEH. The dual-band antenna rectifier codesign device may comprise: a dual-band antenna that is electrically tuned to two frequency bands; and a rectifier electrically coupled to the dual-band antenna, where the rectifier is electrically tuned to the two frequency bands of the dual-band antenna, the dual-band antenna has a first reactance, the rectifier has a second reactance, and the second reactance is approximately equal to a negative value of the first reactance at each of the two frequency bands to cause the dual-band antenna to resonate at the two frequency bands.

Examples of the AEH apparatus and/or dual-band antenna rectifier codesign device may include a single antenna configured for resonance in multiple bands coupled to a (single) rectifier, where the rectifier is coupled to circuitry for energy harvesting. The multiple bands may include unlicensed industrial, scientific, and medical (ISM) bands, for example 900 MHZ and 2400 MHz. A capacitor bank or other means may be used to tune the rectifier. In this example, a separate antenna may be used for data communications.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

Figure 1:
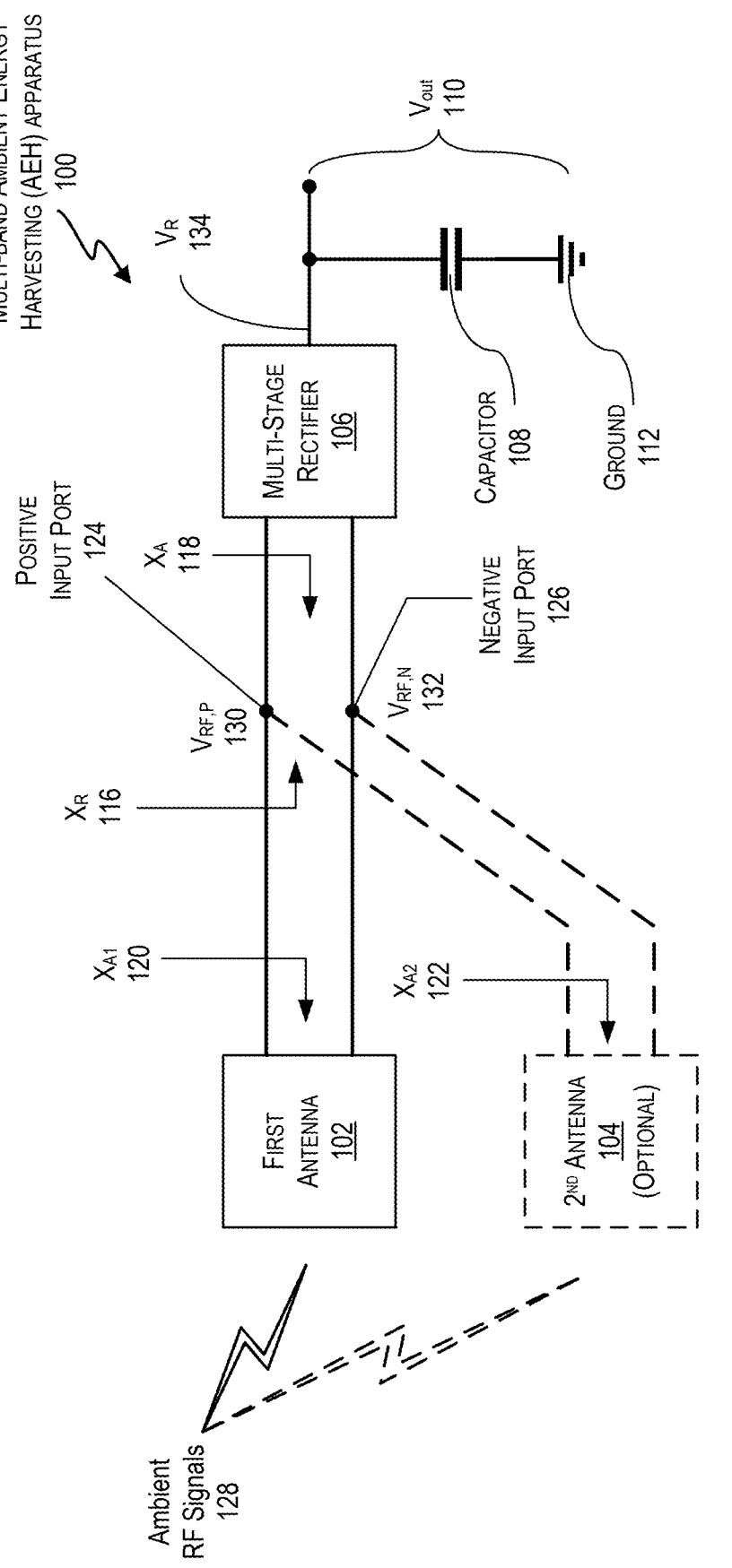
FIG. 1 is a simplified block diagram of an example of an implementation of a multi-band ambient energy harvesting apparatus in accordance with the disclosure.

In FIG. 1, a simplified block diagram is shown of an example of an implementation of a multi-band AEH apparatus 100 in accordance with the disclosure. The multi-band AEH apparatus 100 may include at least one antenna that is electrically tuned to multiple frequency bands and a rectifier electrically coupled to the at least one antenna. In this example, the at least one antenna may include either a single first antenna 102 or the first antenna 102 and an optional second antenna 104. The rectifier may be a multi-stage rectifier 106 that includes a bank of capacitors that is configured to vary the capacitive reactance of the multi-stage rectifier 106. The multi-stage rectifier 106 may be electrically coupled to a capacitor 108 to ground 112 that is configured to filter out any frequency components from the multi-stage rectifier 106 to produce a direct current (DC) electrical voltage ($V_{out}$ 110).

In this example, the multi-band AEH apparatus 100 is an antenna rectifier codesign device for AEH, where the input reactance ($X_R$ 116) of the multi-stage rectifier 106 is designed and set to be equal, or approximately equal, to a negative value of the input reactance ($X_A$ 118) of the at least one antenna. In this example, $X_A$ 118 may be equal to an input reactance ($X_{A1}$ 120) of the first antenna 102, when the at least one antenna only includes a single multi-band antenna (i.e., the first antenna 102) or a summation of $X_{A1}$ 120 and an input reactance ($X_{A2}$ 122) of the optional second antenna 104, when the at least one antenna includes at least two antennas (i.e., first antenna 102 and optional second antenna 104). In addition, the input resistance of the multi-stage rectifier 106 may also be designed and set to be equal, or approximately equal, to the input resistance of the at least one antenna.

In this example, the first antenna 102 and optional second antenna 104 (if present) are shown electrically coupled/connected to the multi-stage rectifier 106 via a positive input port 124 and a negative input port 126. In this example, if the optional second antenna 104 is not present, the first antenna 102 may be a multi-band antenna that is tuned to resonate at multiple frequencies corresponding to the multiple bands of operation of the multi-band AEH apparatus 100; or if the optional second antenna 104 is present, the first antenna 102 may alternatively be an antenna that is tuned to resonate at a first frequency of operation and the optional second antenna 104 is tuned to resonate at a second frequency of operation.

In these examples, the multi-stage rectifier 106 may include a tuning capacitor bank that is configured to vary the reactance (i.e., varies the capacitance) of the multi-stage rectifier 106 to cause the at least one antenna to resonate at each of the multiple frequency bands. As an example, the tuning capacitor bank of the multi-stage rectifier 106 may include a plurality of series-connected cross-couple differential drive (CCDD) stages. Further, the at least one antenna may have a variable inductance that varies in frequency and the variable capacitance of the multi-stage rectifier 106 and the variable inductance of the at least one antenna combine to cause the at least one antenna to resonate at each of the multiple frequency bands.

As an example, the multi-band AEH apparatus 100 may be a dual-band antenna rectifier codesign device that includes a single antenna (i.e., the first antenna 102) that is coupled to a (single) rectifier (i.e., the multi-stage rectifier 106). In this example, the first antenna 102 may be configured to resonate in multiple bands that may include the ISM bands. As an example, the multi-band AEH apparatus 100 may be configured to resonate at 900 MHz and 2,400 MHz. In this example, the multi-stage rectifier 106 may be electrically coupled to the capacitor 108 for filtering out any frequency components from the multi-stage rectifier 106, where the multi-stage rectifier 106 may include multiple stages that include one or more capacitor banks or other means to tune the multi-stage rectifier 106 to have XR 116 that is equal, or approximately equal to, the negative value of the $X_A$ 118. In this example, the multi-band AEH apparatus 100 may include a third separate antenna (not shown) for data communications with other circuitry/components (not shown) of the multi-band AEH apparatus 100.

In this example, the first antenna 102 may be a T-matched dipole antenna, and/or a loop antenna. If the optional second antenna 104 is not present, the first antenna 102 may be a multi-band antenna such as a dual-band antenna.

In an example of operation, the multi-band AEH apparatus 100 is configured to receive ambient radio frequency (RF) signals 128 at multiple frequencies and produce $V_{out}$ 110 from the harvested energy from the ambient RF signals 128. If the optional second antenna 104 is not present, the first antenna 102 receives the ambient RF signals 128 at multiple frequencies. It should be noted that for this example, the ambient RF signals 128 are assumed to be propagated RF signals at different frequencies, where the first antenna 102 is configured to receive the ambient RF signals 128 that are at the tuned bands of the first antenna 102. As an example, if the first antenna 102 is tuned to 900 MHz and 2,400 MHZ, the first antenna 102 will receive, if present, the ambient RF signals 128 that at 900 MHz and 2,400 MHz. Once received, the first antenna 102 will produce a signal voltage across the positive input port 124 and negative input port 126 that includes a positive RF signal voltage ($V_{RF,P}$ 130) at the positive input port 124 and a negative RF signal voltage ($V_{RF,N}$ 132) at the negative input port 126. The $V_{RF,N}$ 132 and $V_{RF,P}$ 130 are alternating current (AC) signals that are injected into the multi-stage rectifier 106 to produce a rectifier voltage ($V_R$ 134) that is filtered by the capacitor 108 to produce $V_{out}$ 110.

Figure 2:
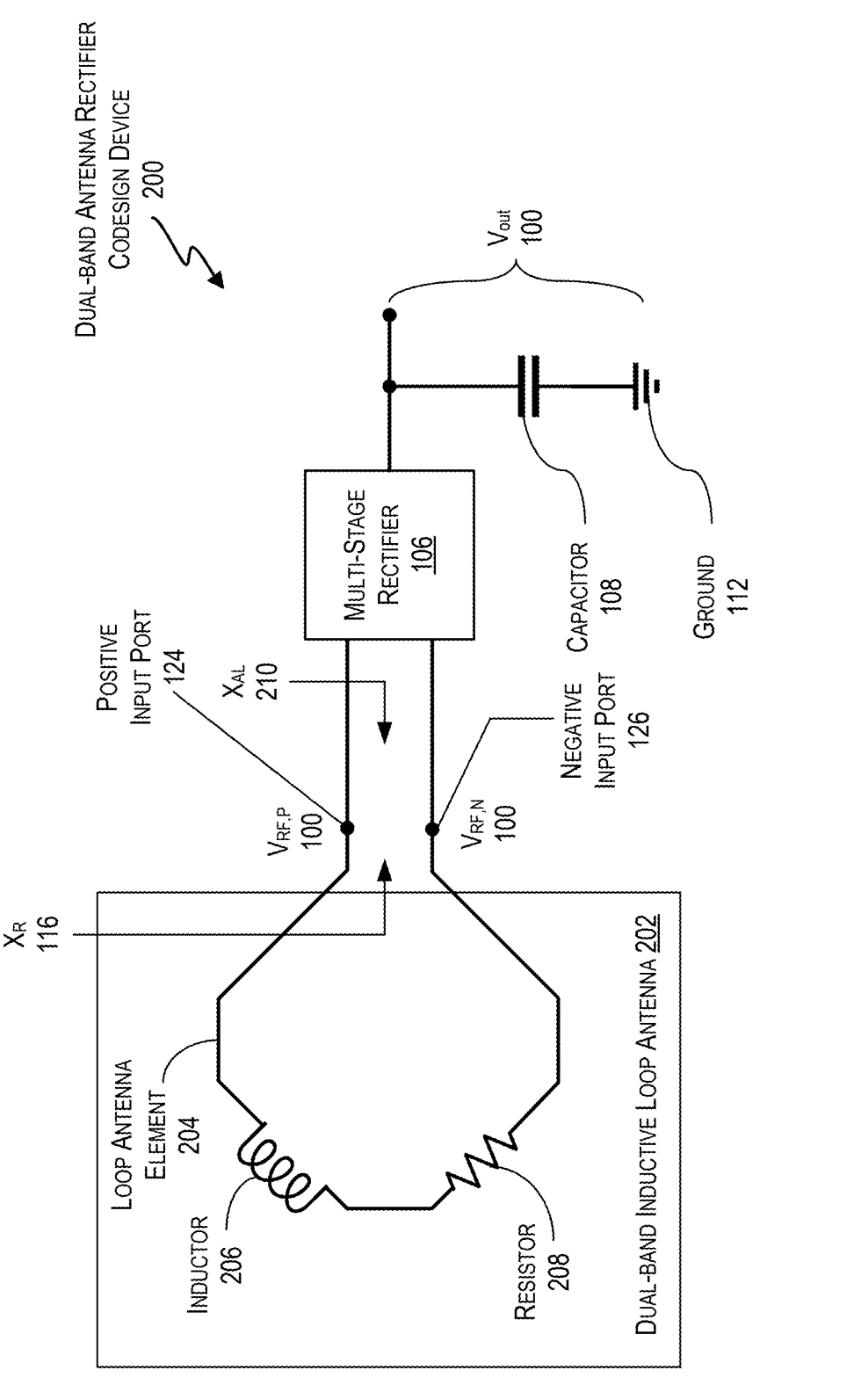
FIG. 2 is a system block diagram of an example of an implementation of a dual-band antenna rectifier codesign device for ambient energy harvesting based on the multi-band ambient energy harvesting apparatus shown in FIG. 1, in accordance with the disclosure.

In FIG. 2, a system block diagram is shown of an example of an implementation of a dual-band antenna rectifier codesign device 200 for ambient energy harvesting based on the multi-band AEH apparatus 100. In this example, the first antenna 102 (shown in FIG. 1) is a dual-band antenna that may be a dual-band inductive loop antenna 202. The dual-band inductive loop antenna 202 may include a loop antenna element 204 of conductive material (i.e., a wire, printed or etched trace, etc.) electrically coupled to the positive input port 124 and negative input port 126. The loop antenna element 204 may include an inductive element (i.e., inductor 206) and resistive element (i.e., resistor 208) to combine to form the input impedance of the dual-band inductive loop antenna 202. In this disclosure, the input reactance ($X_{AL}$ 210) of the dual-band inductive loop antenna 202 is the non-resistive (i.e., excludes the resistor 208) part of the input impedance of the dual-band inductive loop antenna 202. In this example, $X_{AL}$ 210 will vary with frequency based on the inductor 206 because the reactance of the inductor 206 is frequency dependent and is equal to the twice π times the AC frequency of the current passing through the inductor 206 times the inductance value of the inductor 206.

In this example, the $X_R$ 116 of the multi-stage rectifier 106 is designed to have a value that is equal to, or approximately equal to, the negative value of $X_{AL}$ 210 at the frequencies of operation of the dual-band antenna rectifier codesign device 200. In addition, the input resistance of the multi-stage rectifier 106 may also have a value that is equal to, or approximately equal to, input resistance (e.g., resistor 208) of the dual-band inductive loop antenna 202. These values may be predetermined and designed into both the dual-band inductive loop antenna 202 and that multi-stage rectifier 106 such that they are an antenna-rectifier codesign that is designed and configured to energy harvest at multiple predefined frequencies. In this example, the multi-stage rectifier 106 may include a plurality of series-connected CCDD stages and a tuning capacitor bank to vary the capacitance of the multi-stage rectifier 106 to cause the dual-band inductive loop antenna 202 to resonate at the different predefined frequencies as a RLC circuit where the R value is equal to the resistance of the resistor 208, the L value is equal to the inductance of the inductor 206, and the C value is equal to the capacitance of the multi-stage rectifier 106.

Figure 3:
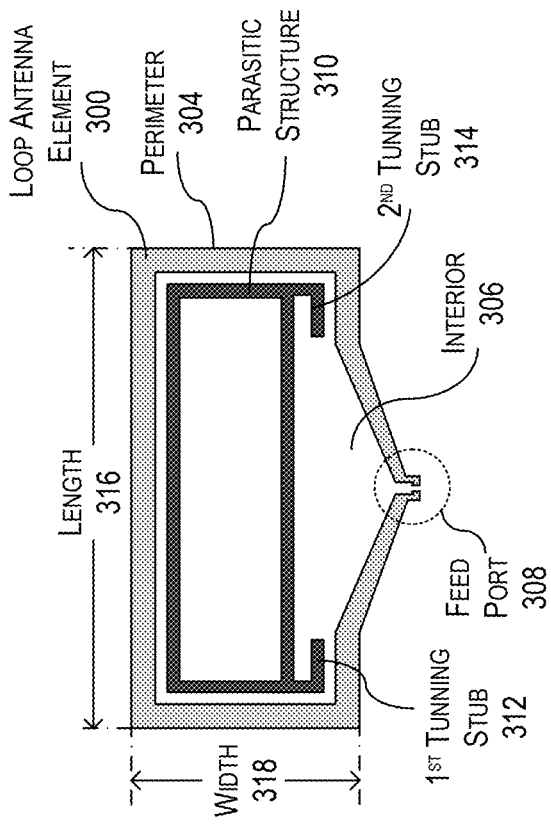
FIG. 3 is a system diagram of an example of a loop antenna element of a dual-band inductive loop antenna of the dual-band antenna rectifier codesign device shown in FIG. 2, in accordance with the disclosure.

Turning to FIG. 3, a system diagram of an example of a loop antenna element 300 of a dual-band inductive loop antenna 302 is shown. As an example, the dual-band inductive loop antenna 302 may be the dual-band inductive loop antenna 202 shown in FIG. 2. In this example, the loop antenna element 300 is shown as semi-rectangular in shape having a perimeter 304, an interior 306 within the perimeter 304, and a feed port 308. The feed port 308 may include the positive input port 124 and negative input port 126 shown in FIGS. 1 and 2.

In this example, the loop antenna element 300 is electrically coupled to the multi-stage rectifier 106 and a parasitic structure/element 310 may be placed in electromagnetic proximity to the loop antenna element 300. The parasitic structure 310 is electromagnetically coupled to the loop antenna element 300 where the variable inductance (i.e., the $X_{AL}$ 210) of the dual-band inductive loop antenna 302 is produced by a loop antenna inductance (i.e., the inductance of the inductor 206) of the loop antenna element 300 and an electromagnetic coupling of the parasitic structure 310 to the loop antenna element 300.

In this example, the parasitic structure may include an electrical isolated conductive element either within (i.e., the interior 306) the perimeter 304 of the loop antenna element 300 or outside of the perimeter 304 of the loop antenna element 300. The parasitic structure 310 is a parasitic element that is generally a passive radiator which is not electrically connected to any other element including the loop antenna element 300. The parasitic structure 310 is configured to modify the impedance of the loop antenna element 300 by acting as a passive resonator that modifies the radiation pattern and gain of the loop antenna element 300 (acting as nearby driven element).

While the parasitic structure 310 is shown in this example as being a rectangular shaped loop element within the interior 306 of the loop antenna element 300, the parasitic structure 310 may alternatively have any shape that is capable of modifying the impedance of the loop antenna element 300. As an example, the parasitic structure 310 may include one or more turning elements (i.e., first tuning stub 312 and second tuning stub 314) configured to modify the radiation pattern and/or gain of the loop antenna element 300. Moreover, the parasitic structure 310 may, optionally, be located outside of the perimeter 304 of the loop antenna element 300 such as, for example, an outside loop surrounding the loop antenna element 300 or as outside passive reflectors that are electromagnetically coupled to the loop antenna element 300.

Turning to FIGS. 4A through 5B, plots for the performance of the example dual-band inductive loop antenna 302 are shown. In these examples, the dual-band inductive loop antenna 302 may have a length 316 equal to 37.8 millimeters, a width equal to 20.4 millimeters, an antenna impedance at 900 MHz of 11+630j ohms, and an antenna impedance at 2,400 MHz of 16+240j ohms.

Figure 4B:
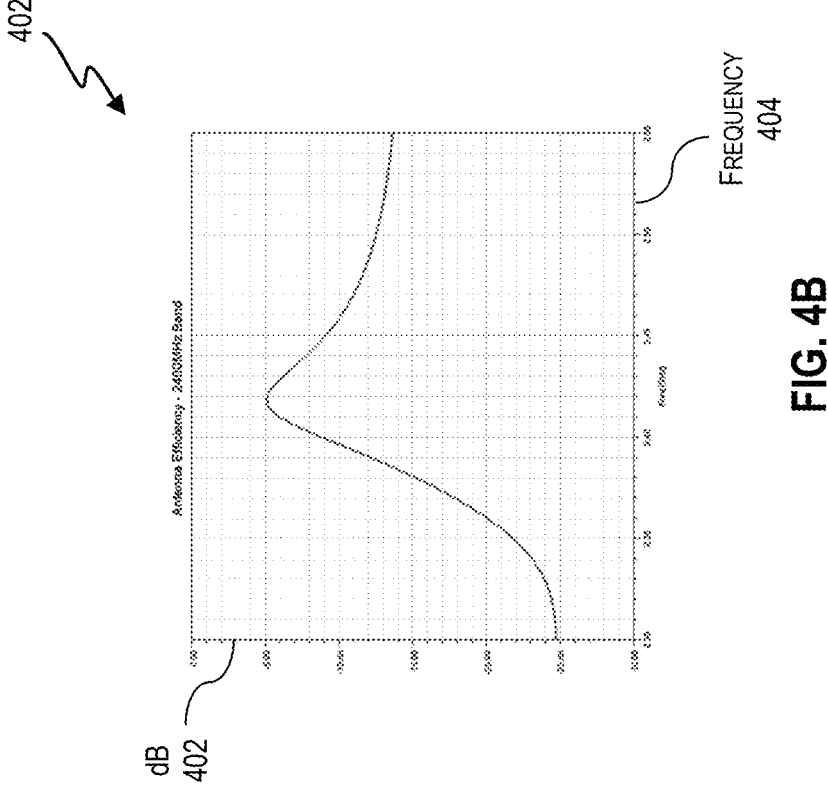
FIG. 4B is a plot of antenna efficiency for the dual-band inductive loop antenna shown in FIG. 3 at a second frequency.
Figure 4A:
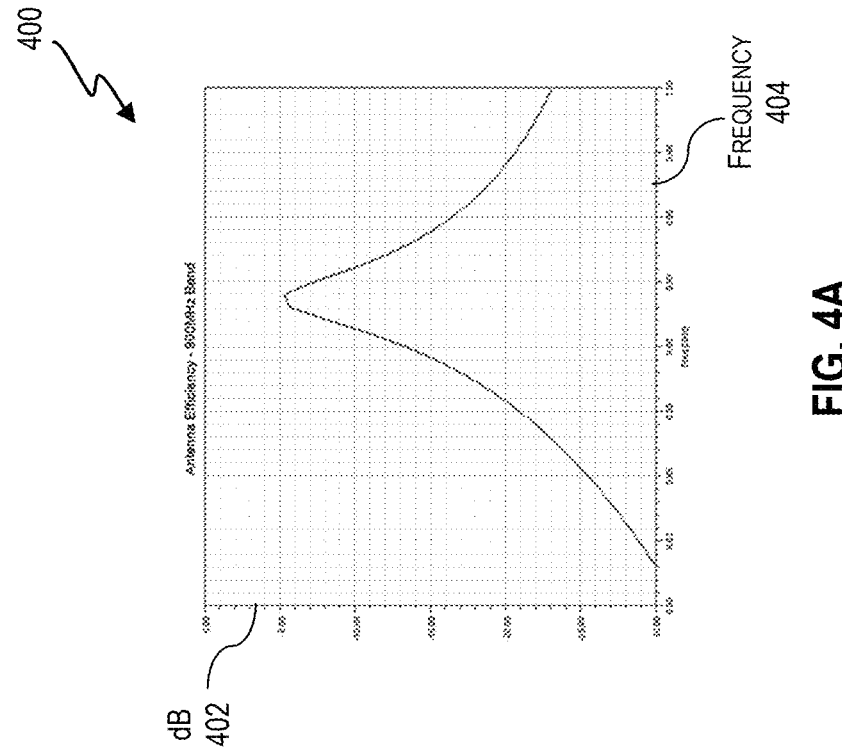
FIG. 4A is a plot of antenna efficiency for the dual-band inductive loop antenna shown in FIG. 3 at a first frequency.

In FIG. 4A, a plot 400 of antenna efficiency is shown for the dual-band inductive loop antenna 302 at a first frequency, such as, for example, 900 MHz; and in FIG. 4B, a plot 402 of antenna efficiency is shown for the dual-band inductive loop antenna 302 at a second frequency, such as, for example, 2,400 MHZ. In both of these examples, the first plot 400 and second plot 402 are plots of efficiency in decibels (dB) 404 versus frequency 406 in GHz. Plot 400 shows that the dual-band inductive loop antenna 302 is resonate at approximately 925 MHz with an efficiency of about-5.2 dB. Similarly, plot 400 shows that the dual-band inductive loop antenna 302 is also resonate at approximately 2,451 MHz with an efficiency of about-5 dB.

Figure 5:
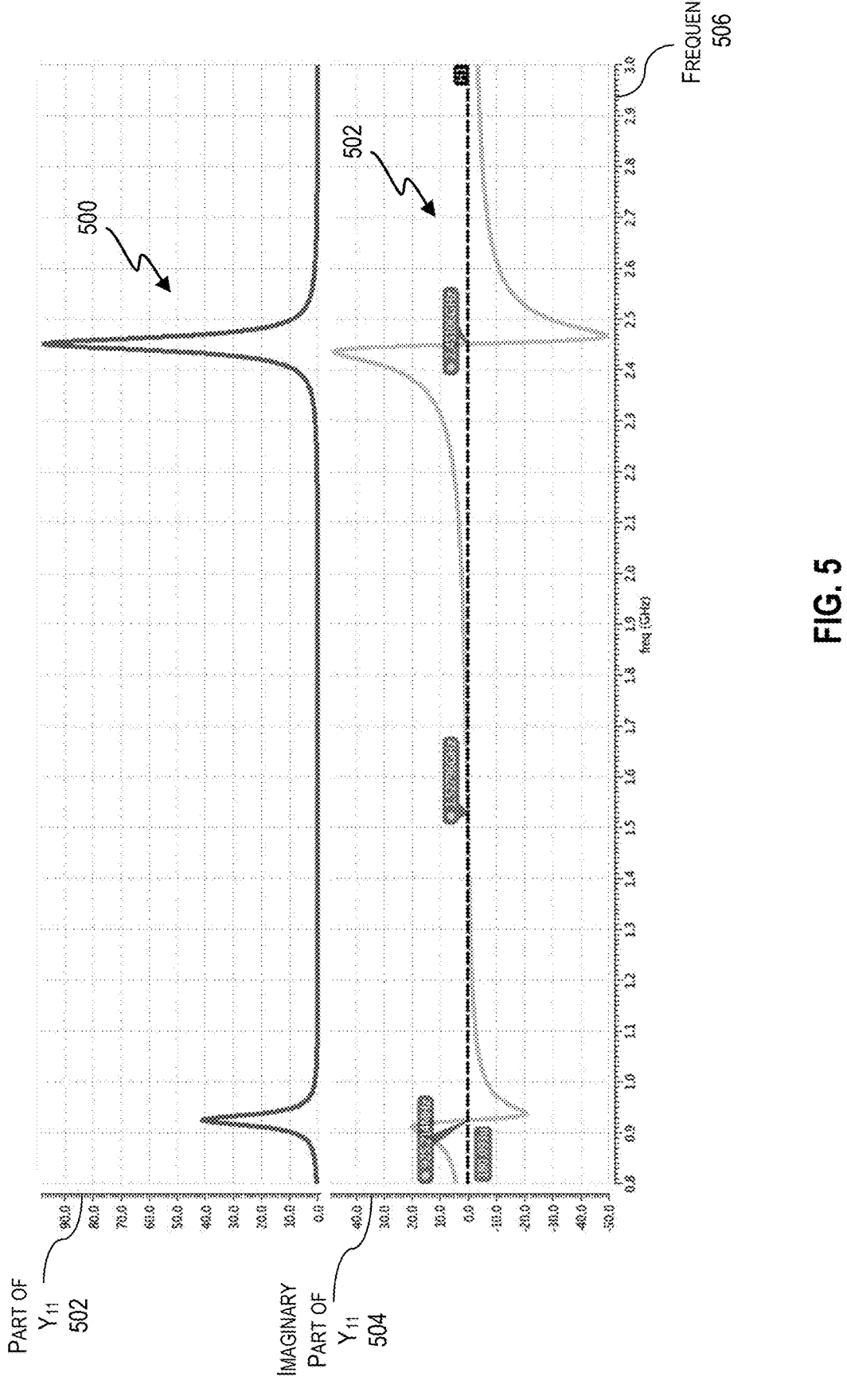
FIG. 5 is a plot of real and imaginary parts of input admittance for the rectifier, shown in FIGS. 1 and 2, with an equivalent load that includes the dual-band inductive loop antenna shown in FIG. 3 at two frequencies.

Turning to FIG. 5, a plot 500 is shown of the real part 504 of the input admittance ($Y_{11}$) for the rectifier 106 with an equivalent load that includes the dual-band inductive loop antenna 302 at the two frequencies of 925 MHz and 2,400 MHz; and a plot 502 of the imaginary part 506 of the $Y_{11}$ for the dual-band inductive loop antenna 302 at 925 MHz and 2,400 MHz. Both plots are versus frequency 508. In both of these plots, plot 500 and plot 502 show that the dual-band inductive loop antenna 302 is resonate at approximately 925 MHz and 2,451 MHz, respectively.

Figure 6:
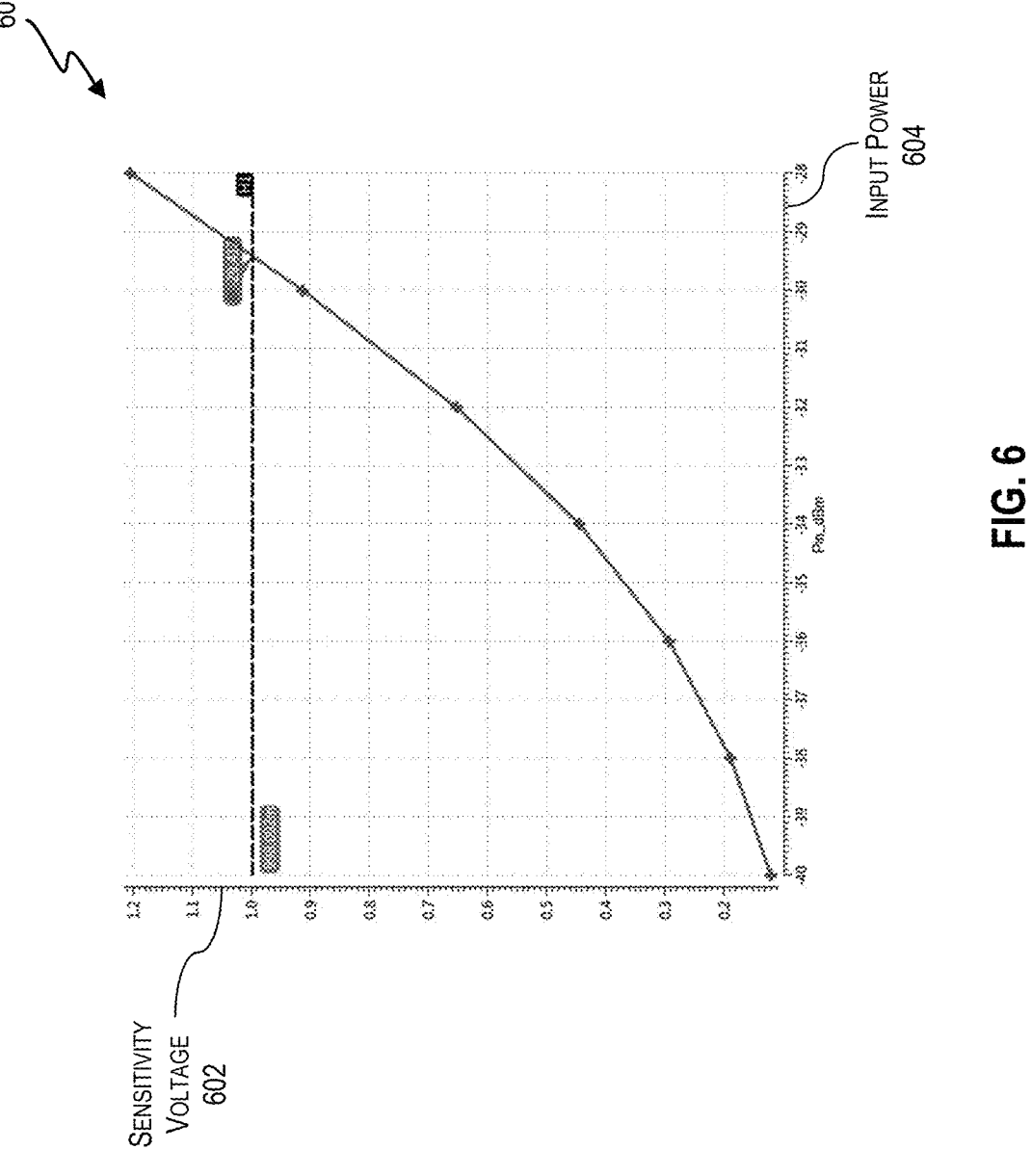
FIG. 6 is a plot of sensitivity for the rectifier, shown in FIGS. 1 and 2, with an equivalent load that includes the dual-band inductive loop antenna shown in FIG. 3 at two frequencies.

In FIG. 6, a plot 600 of the sensitivity for the rectifier 106 with an equivalent load that includes the dual-band inductive loop antenna 302 is shown at two frequencies of 925 MHz and 2,400 MHz. The plot 600 is of sensitivity voltage 602 versus input power (dBm) 604. The plot 600 shows that the dual-band inductive loop antenna 302 is able to achieve approximately 1 volt output at a total input power of −29.4 dBm.

Figure 7:
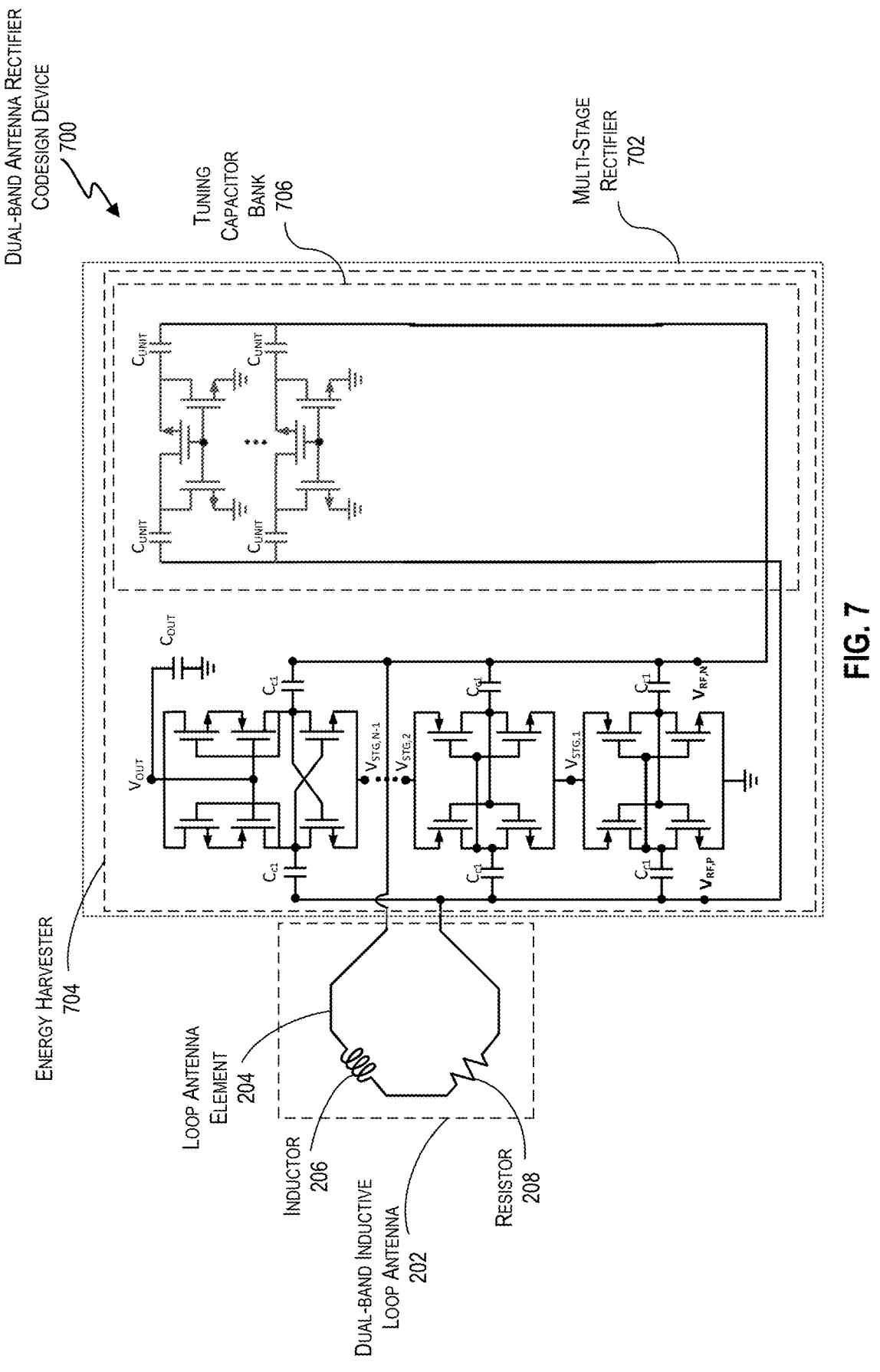
FIG. 7 is a system block diagram of an example of another implementation of a dual-band antenna rectifier codesign device for ambient energy harvesting based on the multi-band ambient energy harvesting apparatus shown in FIG. 1, in accordance with the disclosure.

Turning to FIG. 7, a system block diagram of an example of another implementation of a dual-band antenna rectifier codesign device 700 for ambient energy harvesting based on the multi-band ambient energy harvesting apparatus 100 of FIG. 1. In this example, the dual-band antenna rectifier codesign device 700 may include a multi-stage rectifier 702 with a plurality of series connected CCDD stages with a complementary diode stage for lower leakage. In this example, the multi-stage rectifier 702 may be in signal communication with the loop antenna 204 where the multi-stage rectifier 702 may be a device that includes an energy harvester 704 having a tuning capacitor bank 706. In this example, each CCDD stage of the multi-stage rectifier 702 may include cross-coupled transistors (e.g., PMOS and NMOS transistors) and AC coupling capacitors (i.e., capacitors $C_{C1}$). The $V_{RF,P}$ and $V_{RF,N}$ notes may be RF inputs that are electrically connected to the dual-band inductive loop antenna 202 and the $V_{STG,i}$ nodes are nodes that connect to both pervious stage outputs and next stage inputs, where "i" is shown to range from 1 to N–1.

Implementation Examples

Implementation examples are provided in the following numbered clauses.

Clause 1. An apparatus for multi-band ambient energy harvesting, the apparatus comprising: at least one antenna that is electrically tuned to multiple frequency bands; and a rectifier electrically coupled to the at least one antenna, wherein the rectifier is electrically tuned to the multiple frequency bands of the at least one antenna, the at least one antenna has a first reactance, the rectifier has a second reactance, and the second reactance is approximately equal to a negative value of the first reactance at each of the multiple frequency bands to cause the at least one antenna to resonate at the multiple frequency bands.

Clause 2. The apparatus of clause 1, wherein the rectifier is a multi-stage rectifier having a tuning capacitor bank that is configured to vary the second reactance to cause the at least one antenna to resonate at each of the multiple frequency bands.

Clause 3. The apparatus of clauses 1 or 2, wherein the at least one antenna includes a first antenna and a second antenna, the multiple frequency bands include a first frequency band and a second frequency band, the first antenna is configured to resonate at the first frequency band, and the second antenna is configured to resonate at the second frequency band.

Clause 4. The apparatus of clause 1 or 2, wherein the at least one antenna includes a dual-band antenna, and the multiple frequency bands consist of two frequency bands.

Clause 5. The apparatus of clause 4, wherein the dual-band antenna is configured to resonate at each of the two frequency bands.

Clause 6. The apparatus of clause 5, wherein the two frequency bands include 900 megahertz and 2,400 megahertz.

Clause 7. The apparatus of clauses 4, 5, or 6, wherein the at least one antenna is a single antenna having a variable inductance that varies as a function of frequency, the rectifier has a variable capacitance that varies in frequency, and the variable capacitance and the variable inductance combine to cause the single antenna to resonate at each of the two frequency bands.

Clause 8. The apparatus of clauses 4, 5, 6, or 7, wherein the at least one antenna is a T-matched dipole antenna.

Clause 9. The apparatus of clause 4, wherein the dual-band antenna is a dual-band inductive loop antenna.

Clause 10. The apparatus of clause 9, wherein the dual-band inductive loop antenna includes a loop antenna element electrically coupled to the rectifier, and a parasitic structure electromagnetically coupled to the loop antenna element, wherein the variable inductance of the dual-band inductive loop antenna is produced by a loop antenna inductance of the loop antenna element and an electromagnetic coupling of the parasitic structure to the loop antenna element.

Clause 11. The apparatus of clause 10, wherein the parasitic structure includes an electrically isolated conductive element within a perimeter of the loop antenna element.

Clause 12. The apparatus of clause 10, wherein the parasitic structure includes an electrically isolated conductive element outside of a perimeter of the loop antenna element.

Clause 13. The apparatus of clauses 10, 11, 12, or 13, wherein the rectifier is a multi-stage rectifier having a tuning capacitor bank that is configured to vary the variable capacitance to cause the dual-band inductive loop antenna to resonate at each of the two frequency bands.

Clause 14. The apparatus of clauses 10, 11, 12, 13, or 14, further including a plurality of series-connected cross-couple differential drive (CCDD) stages.

Clause 15. The apparatus of clause 1, 2, 3, 4, or 15 wherein the at least one antenna has a first resistance, and the rectifier has a second resistance that is approximately equal to the first resistance.

Clause 16. A dual-band antenna rectifier codesign device for ambient energy harvesting, the dual-band antenna rectifier codesign device comprising: a dual-band antenna that is electrically tuned to two frequency bands; and a rectifier electrically coupled to the at the dual-band antenna, wherein the rectifier is electrically tuned to the two frequency bands of the dual-band antenna, the dual-band antenna has a first reactance, the rectifier has a second reactance, and the second reactance is approximately equal to a negative value of the first reactance at each of the two frequency bands to cause the dual-band antenna to resonate at the two frequency bands.

Clause 17. The dual-band antenna rectifier codesign device of clause 16, wherein the dual-band antenna is a dual-band inductive loop antenna that includes a loop antenna element electrically coupled to the rectifier, and a parasitic structure electromagnetically coupled to the loop antenna element, wherein the loop antenna element has a variable inductance that varies as a function of frequency and is produced by a loop antenna inductance of the loop antenna element and an electromagnetic coupling of the parasitic structure to the loop antenna element, the rectifier has a variable capacitance that varies as a function of frequency, and the variable capacitance and the variable inductance combine to cause the dual-band antenna to resonate at each of the two frequency bands.

Clause 18. The dual-band antenna rectifier codesign device of clause 17, wherein the parasitic structure includes an electrically isolated conductive element within a perimeter of the loop antenna element.

Clause 19. The dual-band antenna rectifier codesign device of clause 18, wherein the parasitic structure includes an electrically isolated conductive element outside of a perimeter of the loop antenna element.

Clause 20. The dual-band antenna rectifier codesign device of clause 19, wherein the rectifier is a multi-stage rectifier having a tuning capacitor bank that is configured to vary the variable capacitance to cause the dual-band inductive loop antenna to resonate at each of the two frequency bands.

Clause 21. The dual-band antenna rectifier codesign device of clause 19, further including a plurality of series-connected cross-couple differential drive (CCDD) stages.

Clause 22. The dual-band antenna rectifier codesign device of clause 16, wherein the dual-band antenna has a first resistance, and the rectifier has a second resistance that is approximately equal to the first resistance.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed:

1. An apparatus for multi-band ambient energy harvesting, the apparatus comprising:

at least one antenna that is electrically tuned to multiple frequency bands including a first frequency band and a second frequency band; and a single rectifier electrically coupled to the at least one antenna, wherein the rectifier is electrically tuned to the multiple frequency bands of the at least one antenna, the at least one antenna has a first reactance that has a first value of the first reactance at the first frequency band and a second value of the first reactance at the second frequency band, the first value of the first reactance being different from the second value of the second reactance, and the rectifier has a second reactance, that has a first value of the second reactance at the first frequency band and a second value of the second reactance at the second frequency band, the first value of the second reactance being equal to a negative value of the first value of the first reactance at the first frequency band and the second value of the second reactance being equal to a negative value of the second value of the second reactance at the second frequency band, to cause the at least one antenna to resonate at the multiple frequency bands.

2. The apparatus of claim 1, wherein the rectifier is a multi-stage rectifier having a tuning capacitor bank that is configured to vary the second reactance to cause the at least one antenna to resonate at each of the multiple frequency bands.

3. The apparatus of claim 1, wherein the at least one antenna includes a first antenna and a second antenna, the first antenna is configured to resonate at the first frequency band, and the second antenna is configured to resonate at the second frequency band.

4. The apparatus of claim 1, wherein the at least one antenna includes a dual-band antenna, and the multiple frequency bands consist of two frequency bands.

5. The apparatus of claim 4, wherein the dual-band antenna is configured to resonate at each of the two frequency bands that are 900 megahertz and 2,400 megahertz.

6. The apparatus of claim 4, wherein the at least one antenna is a single antenna having a variable inductance that varies as a function of frequency, the rectifier has a variable capacitance that varies as a function of frequency, and the variable capacitance and the variable inductance combine to cause the single antenna to resonate at each of the two frequency bands.

7. The apparatus of claim 6, wherein the single antenna is a T-matched dipole antenna.

8. The apparatus of claim 6, wherein the dual-band antenna is a dual-band inductive loop antenna.

9. The apparatus of claim 8, wherein the dual-band inductive loop antenna includes a loop antenna element electrically coupled to the rectifier, and a parasitic structure electromagnetically coupled to the loop antenna element, wherein the variable inductance of the dual-band inductive loop antenna is produced by a loop antenna inductance of the loop antenna element and an electromagnetic coupling of the parasitic structure to the loop antenna element.

10. The apparatus of claim 9, wherein the parasitic structure includes an electrically isolated conductive element within a perimeter of the loop antenna element.

11. The apparatus of claim 9, wherein the parasitic structure includes an electrically isolated conductive element outside of a perimeter of the loop antenna element.

12. The apparatus of claim 8, wherein the rectifier is a multi-stage rectifier having a tuning capacitor bank that is configured to vary the variable capacitance to cause the dual-band inductive loop antenna to resonate at each of the two frequency bands.

13. The apparatus of claim 12, further including a plurality of series-connected cross-couple differential drive (CCDD) stages.

14. The apparatus of claim 1, wherein the at least one antenna has a first resistance, and the rectifier has a second resistance that is equal to the first resistance.

15. A dual-band antenna rectifier codesign device for ambient energy harvesting, the dual-band antenna rectifier codesign device comprising:

a dual-band antenna that is electrically tuned to two frequency bands; and a rectifier electrically coupled to the dual-band antenna; wherein the rectifier is electrically tuned to the two frequency bands of the dual-band antenna, the dual-band antenna has a first reactance, the rectifier has a second reactance that is equal to a negative value of the first reactance at each of the two frequency bands to cause the dual-band antenna to resonate at the two frequency bands, and wherein the dual-band antenna is a dual-band inductive loop antenna that includes a loop antenna element electrically coupled to the rectifier, and a parasitic structure electromagnetically coupled to the loop antenna element, wherein the loop antenna element has a variable inductance that varies as a function of frequency and is produced by a loop antenna inductance of the loop antenna element and an electromagnetic coupling of the parasitic structure to the loop antenna element, the rectifier has a variable capacitance that varies as a function of frequency, and the variable capacitance and the variable inductance combine to cause the dual-band antenna to resonate at each of the two frequency bands.

16. The dual-band antenna rectifier codesign device of claim 15, wherein the parasitic structure includes an electrically isolated conductive element either within a perimeter of the loop antenna element or outside of the perimeter of the loop antenna element.

17. The dual-band antenna rectifier codesign device of claim 15, wherein the rectifier is a multi-stage rectifier having a tuning capacitor bank that is configured to vary the variable capacitance to cause the dual-band inductive loop antenna to resonate at each of the two frequency bands.

18. The dual-band antenna rectifier codesign device of claim 17, further including a plurality of series-connected cross-couple differential drive (CCDD) stages.

19. The dual-band antenna rectifier codesign device of claim 15, wherein the dual-band antenna has a first resistance, and the rectifier has a second resistance that is equal to the first resistance.

\* \* \* \* \*